United States Patent
Ota et al.

(10) Patent No.: US 8,283,014 B2
(45) Date of Patent: Oct. 9, 2012

(54) OPTICAL RECORDING MEDIUM

(75) Inventors: Teruyuki Ota, Miyagi (JP); Makoto Watanabe, Miyagi (JP); Yoshihito Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 370 days.

(21) Appl. No.: 12/651,565

(22) Filed: Jan. 4, 2010

(65) Prior Publication Data

US 2010/0203280 A1     Aug. 12, 2010

(30) Foreign Application Priority Data

Feb. 12, 2009   (JP) ................ 2009-030384

(51) Int. Cl.
 *B32B 3/02* (2006.01)
(52) U.S. Cl. .............. 428/64.1; 428/64.4; 428/64.5; 428/64.6; 430/270.13
(58) Field of Classification Search ............ 428/64.1
See application file for complete search history.

(56) References Cited

U.S. PATENT DOCUMENTS

| | | | |
|---|---|---|---|
| 7,608,385 B2 * | 10/2009 | Kojima et al. | 430/271.1 |
| 7,947,353 B2 * | 5/2011 | Sakaue et al. | 428/64.1 |
| 2009/0129252 A1 | 5/2009 | Endoh et al. | |

FOREIGN PATENT DOCUMENTS

| | | |
|---|---|---|
| JP | 7-307036 | 11/1995 |
| JP | 2002-237088 | 8/2002 |
| JP | 2002-288879 | 10/2002 |
| JP | 2004-22094 | 1/2004 |
| JP | 2004-310992 | 11/2004 |
| JP | 2005-267779 | 9/2005 |
| JP | 2007-164965 | 6/2007 |
| JP | 2008-90984 | 4/2008 |
| WO | WO 2007/063687 A1 | 6/2007 |

OTHER PUBLICATIONS

Office Action issued Nov. 16, 2010, in Japanese Patent Application No. 2009-030384.

* cited by examiner

*Primary Examiner* — Elizabeth Mulvaney
(74) *Attorney, Agent, or Firm* — Oblon, Spivak, McClelland, Maier & Neustadt, L.L.P.

(57) ABSTRACT

Disclosed herein is an optical recording medium, including: a substrate; and an information recording layer formed on the substrate, an information signal being recorded and reproduced in and from the information recording layer by radiation of a light; wherein the information recording layer includes a reflecting layer, a dielectric layer formed on the reflecting layer, and a recording layer formed on the dielectric layer, the dielectric layer includes a first dielectric layer and a second dielectric layer, and a thermal conductivity of the second dielectric layer located on the reflecting layer side is higher than that of the first dielectric layer located on the recording layer side.

9 Claims, 6 Drawing Sheets

OPTICAL RECORDING MEDIUM

BACKGROUND OF THE INVENTION

1. Field of the Invention

The present invention relates to an optical recording medium, and more particularly to an optical recording medium in and from which an information signal is recorded and reproduced by radiating thereto a light.

2. Description of the Related Art

Heretofore, an optical recording medium from and to which an information signal is read out and written by radiating a laser beam to an information recording layer thereof has been widely prevalent. The information recording layer of the optical recording medium is structured by laminating a recording layer, a dielectric layer and the like in order on a substrate.

At present, the increasing of a recording density is being actively made for the purpose of being capable of recording as much information as possible in such an optical recording medium. The increased recording density for the optical recording medium until now is made by reducing a diameter of an optical spot condensed onto the optical recording medium. The diameter of the optical spot is limited by a wavelength, A, of a laser beam emitted from a light source used, and a Numerical Aperture (NA) of an objective lens, and is approximately proportional to $\lambda/(2NA)$. Therefore, for the purpose of attaining the increased recording density, it is necessary to shorten a wavelength of a laser beam, and to increase the NA of the objective lens. With regard to the wavelength, the wavelength is 830 nm in the first-generation optical disc, whereas in a current Digital Versatile Disc (DVD), the wavelength is shortened to 650 nm. In addition, with regard to the NA as well, the NA is about 0.45 in the first-generation optical disc, whereas the NA is increased up to 0.60 in the current DVD. Moreover, in recent years, an optical recording medium (Blu-ray Disc (BD: registered trademark)) for which a blue laser device for emitting a laser beam having a wavelength of 405 nm is used as a light source and thus the NA is increased up to 0.85 has been made fit for practical use.

On the other hand, a multi-layer optical recording medium is also proposed in which a plurality of information recording layers are formed (multi-stradified) on one side of a substrate, thereby increasing a recording density. In this multi-layer optical recording medium, an optical separating layer is formed between each adjacent two information recording layers of a plurality of information recording layers, and focal points of the laser beams are focused on the respective information recording layers, thereby making it possible to record and reproduce information signals in and from the respective information recording layers independently of one another. In the case as well of the Blu-ray Disc format structured under the condition that the waveform is 405 nm, and the NA is 0.85, the optical information recording layers are formed in the form of two layers, thereby making it possible to attain a recording capacity of 50 GB which is twice as large as that of 25 GB in a single optical information recording layer.

Normally, a phase-change recording material in which a crystalline phase and an amorphous phase are reversibly changed over to each other by radiating thereto the laser beam is used in the recording layer used in the rewritable Blu-ray Disc or the like. In the phase-change recording material, a temperature of the recording layer heated by the radiation of the laser beam is quickly reduced, thereby making it possible to form the amorphous phase (recording mark). For this reason, a reflecting layer provided on a side opposite to a laser beam incidence side with respect to the phase-change recording layer also plays a role as a thermal diffusion layer. In particular, an Ag alloy film which has a large reflectivity and a large thermal conductivity for the laser beam having the wavelength of 405 nm is generally used in the case of the rewritable Blu-ray Disc using the laser beam having the wavelength of 405 nm. See Japanese Patent Laid-open No. 2007-164965 (paragraph [0053] and [0103]), for example.

SUMMARY OF THE INVENTION

A process for releasing the heat of the phase-change recording layer heated by the radiation of the laser beam through the Ag alloy film is repetitively carried out every recording operation in the rewritable optical recording medium. For this reason, when the number of times of the recording operations reaches multiple times, the thermal damage is accumulated in the phase-change recording layer. As a result, this situation has a tendency to loss the function of reversibly changing the crystalline phase and the amorphous phase over to each other, thereby deteriorating the repetitive recording characteristics.

Moreover, in the case of the multi-layer optical recording medium having the two or more information recording layers, the recording and reproducing of the information signal in and from the information recording layer located apart from the incidence surface side of the laser beam are carried out through the information recording layer located close to the incidence surface side of the laser beam. For this reason, such a film design as to transmit the laser beam made incident is desired for the information recording layer located close to the incidence surface side of the laser beam. Thus, the Ag alloy film which largely absorbs the laser beam may not be thickly provided in the form of the reflecting layer. The reflecting layer of the optical recording medium having one information recording layer on the substrate is formed from the Ag alloy film, for example, having a thickness of about 100 nm. On the other hand, the reflecting film of the information recording layer located close to the incidence surface side of the laser beam is formed from the Ag alloy film, for example, having the thickness of 10 nm from a viewpoint of ensuring a transmittance. In the case of the information recording layer having such a thin Ag alloy film, the heat of the phase-change recording layer heated by the radiation of the laser beam during the recording of the information signal may not be released through the Ag alloy film, and thus the repetitive recording characteristics are remarkably deteriorated.

The embodiments of the present invention have been made in order to solve the problems described above, and it is therefore desirable to provide an optical recording medium which is excellent in a repetitive recording durability.

In order to attain the desire described above, according to an embodiment of the present invention, there is provided an optical recording medium, including:

a substrate; and an information recording layer formed on the substrate, an information signal being recorded and reproduced in and from the information recording layer by radiation of a light;

in which the information recording layer includes a reflecting layer, a dielectric layer formed on the reflecting layer, and a recording layer formed on the dielectric layer, the dielectric layer includes a first dielectric layer and a second dielectric layer, and a thermal conductivity of the second dielectric layer located on the reflecting layer side is higher than that of the first dielectric layer located on the recording layer side.

According to another embodiment of the present invention, there is provided an optical recording medium, including:

a substrate; and a first information recording layer and a second information recording layer formed on the substrate, information signals being recorded and reproduced in and from the first information recording layer and the second information recording layer, respectively, by radiation of a light;

in which the information signal is recorded and reproduced in and from the first information recording layer by radiating the light transmitted through the second information recording layer to the first information recording layer, the second information recording layer includes a reflecting layer, a dielectric layer formed on the reflecting layer, and a recording layer formed on the dielectric layer, the dielectric layer includes a first dielectric layer and a second dielectric layer, and a thermal conductivity of the second dielectric layer located on the reflecting layer side is higher than that of the first dielectric layer located on the recording layer side.

According to still another embodiment of the present invention, there is provided an optical recording medium, including:

a substrate; and an information recording layer formed on the substrate, an information signal being recorded and reproduced in and from the information recording layer by radiation of a light;

in which the information recording layer includes a reflecting layer, a dielectric layer formed on the reflecting layer, and a recording layer formed on the dielectric layer, and the dielectric layer contains therein oxides of silicon, indium and zirconium.

According to yet another embodiment of the present invention, there is provided an optical recording medium, including:

a substrate; and a first information recording layer and a second information recording layer formed on the substrate, information signals being recorded and reproduced in and from the first information recording layer and the second information recording layer, respectively, by radiation of a light;

in which the information signal is recorded and reproduced in and from the first information recording layer by radiating the light transmitted through the second information recording layer to the first information recording layer, the second information recording layer includes a reflecting layer, a dielectric layer formed on the reflecting layer, and a recording layer formed on the dielectric layer, and the dielectric layer contains therein oxides of silicon, indium and zirconium.

In the embodiment of the present invention, the first dielectric layer and the second dielectric layer are each formed between the recording layer and the reflecting layer, and the thermal conductivity of the second dielectric layer located on the reflecting layer side is made higher than that of the first dielectric layer located on the recording layer side. As a result, the heat of the recording layer heated by the radiation of the light can be quickly released to the reflecting layer, and thus the repetitive recording durability can be enhanced.

In the another embodiment of the present invention, in the second information recording layer, the first dielectric layer and the second dielectric layer are each formed between the recording layer and the reflecting layer, and the thermal conductivity of the second dielectric layer located on the reflecting layer side is made higher than that of the first dielectric layer located on the recording layer side. Therefore, even when the thickness of the reflecting layer is thinned for the purpose of controlling the transmittance of the light transmitted through the second information recording layer, the heat of the recording layer heated by the radiation of the light can be quickly released to the reflecting layer. Therefore, the repetitive recording durability can be enhanced in the multi-layer optical recording medium as well in which heretofore, the repetitive recording durability has been remarkably deteriorated.

In the still another embodiment of the present invention, the dielectric layer is formed between the recording layer and the reflecting layer, and the dielectric layer contains therein the oxides of silicon, indium and zirconium. As a result, the heat of the recording layer heated by the radiation of the light can be quickly released to the reflecting layer, and thus the repetitive recording durability can be enhanced.

In the yet another embodiment of the present invention, in the second information recording layer, the dielectric layer contains therein the oxides of silicon, indium and zirconium. Therefore, even when the thickness of the reflecting layer is thinned for the purpose of controlling the transmittance of the light transmitted through the second information recording layer, the heat of the recording layer heated by the radiation of the light can be quickly released to the reflecting layer. Therefore, the repetitive recording durability can be enhanced in the multi-layer optical recording medium as well in which heretofore, the repetitive recording durability has been remarkably deteriorated.

In the embodiment and another embodiment of the present invention, preferably, the recording layer is a recording layer in which the information signal can be repetitively recorded by the radiation of the light. Preferably, the recording layer contains therein bismuth, germanium and tellurium. In addition, preferably, each of the first dielectric layer and the second dielectric layer contains therein oxides of silicon, indium and zirconium, and a ratio of the oxide of indium contained in the second dielectric layer is larger than that of the oxide of indium contained in the first dielectric layer. As a result, the thermal conductivity of the second dielectric layer located on the reflecting layer side can be made higher than that of the first dielectric layer located on the recording layer side. In addition, when the recording layer containing therein bismuth, germanium and tellurium, and the first dielectric layer and the second dielectric layer each containing therein the oxides of silicon, indium and zirconium are combined with each other, creation of a crystal in the recording layer can be controlled, thereby obtaining the more satisfactory signal characteristics.

In the still another embodiment and yet another embodiment of the present invention, the recording layer is a recording layer in which the information signal can be repetitively recorded by the radiation of the light. Preferably, the recording layer contains therein bismuth, germanium and tellurium. In addition, the recording layer containing therein bismuth, germanium and tellurium, and the dielectric layer containing therein the oxides of silicon, indium and zirconium are combined with each other, whereby the creation of the crystal in the recording layer can be controlled, thereby obtaining the more satisfactory signal characteristics.

In the another embodiment and yet another embodiment of the present invention, preferably, the first information recording layer includes a recording layer containing therein germanium, antimony and tellurium, and the second information recording layer includes a recording layer containing therein bismuth, germanium and tellurium. The first information recording layer and the second information recording layer having the respective structures described above are combined with each other, thereby making it possible to obtain the excellent recording characteristics.

In the embodiment to the yet another embodiment of the present invention, preferably, the optical recording medium further has: an incidence surface to which the light is made incident; and a back surface located on a side opposite to the incidence surface; in which the recording layer, the dielectric layer and the reflecting layer are laminated in this order from the incidence surface to the back surface. In addition, preferably, a protective layer is formed on the information recording layer, or the first information recording layer or the second information recording layer. Preferably, the protective layer is formed in the form of a substrate, a thin film, a film or a sheet. When the laser beam for recording and reproducing of the information signal is radiated from a side of the protective layer, preferably, the protective layer can transmit the laser beam.

As set forth hereinabove, according to the embodiments of the present invention, it is possible to enhance the repetitive recording durability of the optical recording medium. In particular, it is possible to enhance the repetitive recording durability in the optical recording medium including the multiple information recording layers.

DETAILED DESCRIPTION OF THE PREFERRED EMBODIMENTS

Preferred embodiments of the present invention will be described in detail hereinafter with reference to the accompanying drawings. It is noted that the description will be given below in accordance with the following order.

1. First Embodiment (the case of an optical recording medium including two information recording layers)

2. Second Embodiment (the case of an optical recording medium including one information recording layer)

3. Third Embodiment (the case of an optical recording medium including two information recording layers where single dielectric layer is provided between a reflecting layer and a recording layer)

4. Fourth Embodiment (the case of an optical recording medium including one information recording layer where single dielectric layer is provided between a reflecting layer and a recording layer)

1. First Embodiment

Structure of Optical Recording Medium

Figure 1:
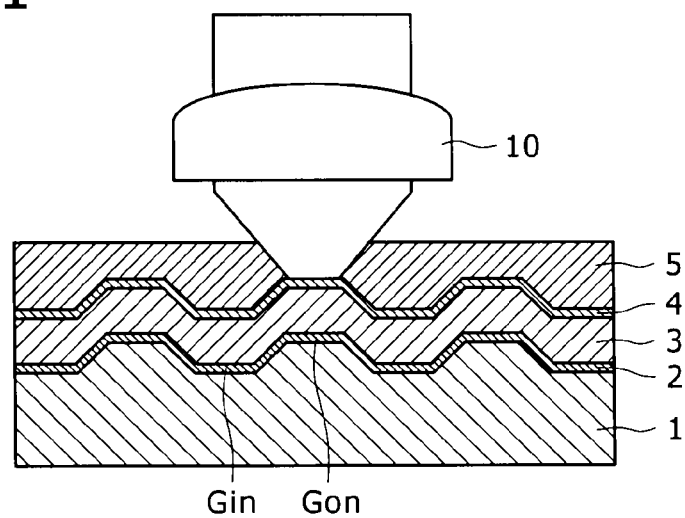
FIG. 1 is a cross sectional view showing a structure of an optical recording medium according to a first embodiment of the present invention.

FIG. 1 is a cross sectional view showing a structure of an optical recording medium according to a first embodiment of the present invention. The optical recording medium of the first embodiment is a rewritable optical recording medium from or to which data can be erased or rewritten. As shown in FIG. 1, the optical recording medium of the first embodiment has a structure in which a first information recording layer (L0 layer) 2, an intermediate layer 3, a second information recording layer (L1 layer) 4, and a cover layer 5 serving as a protective layer are laminated in this order on a substrate 1.

In the optical recording medium of the first embodiment, a laser beam is radiated from a side of the cover layer 5 to either the first information recording layer 2 or the second information recording layer 4, thereby recording and reproducing an information signal in and from either the first information recording layer 2 or the second information recording layer 4. For example, a laser beam having a wavelength of 400 to 410 nm is condensed by an objective lens 10 having a numerical aperture of 0.84 to 0.86 to be radiated from the cover layer 5 side to either the first information recording layer 2 or the second information recording layer 4, thereby recording and reproducing the information signal. Blu-ray Disc Rewritable (BD-RE), for example, is given as an example of such an optical recording medium.

The optical recording medium has an incidence surface to which the laser beam is made incident, and a back surface located on a side opposite to the incidence surface. Also, the second information recording layer 4 is disposed on a front side and the first information recording layer 2 is disposed on a back side with the incidence surface as a reference. The second information recording layer 4 is a semi-transparent layer structured so as to be capable of transmitting the laser beam which is radiated to the first information recording layer 2. Therefore, the recording and reproducing of the information signal in and from the first information recording layer 2 are carried out by radiating the laser beam transmitted through the second information recording layer 4 to the first information recording layer 2.

Hereinafter, the substrate 1, the first information recording layer 2, the intermediate layer 3, the second information recording layer 4, and the cover layer 5 composing the optical recording medium of the first embodiment will be described in order.

Substrate

The substrate 1 has a toric shape in which an opening (hereinafter referred to as "a center hole") is formed at a center thereof. One principal surface of the substrate 1, for example, is a concave-convex surface. Also, the first information recording layer 2 is deposited on the concave-convex surface. Hereinafter, a concave portion of the concave-convex surface will be referred to as "an in-groove Gin," and a convex portion of the concave-convex surface will be referred to as "an on-groove Gon."

Various kinds of shapes such as a spiral shape and a concentric shape are given as examples of the shapes of the in-groove Gin and the on-groove Gon. In addition, the in-groove Gin and/or the on-groove Gon, for example, is wobbled (snaked) in order to add address information.

A diameter of the substrate 1, for example, is selected as 120 mm. A thickness of the substrate 1 is selected in consideration of the rigidity, and is preferably selected from the range of 0.3 to 1.3 mm, and is more preferably selected from the range of 0.6 to 1.3 mm. For example, the thickness of the substrate 1 is selected as 1.1 mm. In addition, a diameter of the center hole, for example, is selected as 15 mm.

A resin material such as a polycarbonate system resin, a polyolefin system resin or an acrylic resin, or a glass can be used as a material for the substrate 1. However, when the cost and the like are taken into consideration, the resin material is preferably used. A cycloolefin polymer (such as ZEONEX (registered trademark)) can be used as the polyolefin system resin.

First Information Recording Layer

Figure 2:
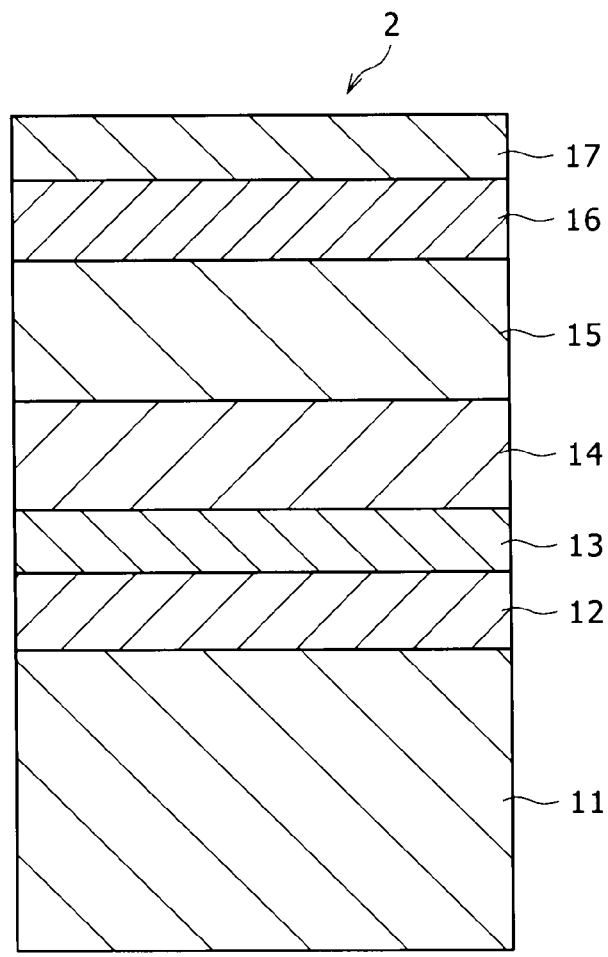
FIG. 2 is a cross sectional view showing a structure of a first information recording layer of the optical recording medium according to the first embodiment of the present invention.

FIG. 2 shows a structure of the first information recording layer. As shown in FIG. 2, the first information recording layer 2, for example, is formed from a lamination film in which a reflecting layer 11, a second dielectric layer 12, a first dielectric layer 13, a recording layer 14, a first dielectric layer 15, a second dielectric layer 16, and a third dielectric layer 17 are laminated in this order on the substrate 1.

A material containing therein an elementary substance such as Al, Ag, Au, Ni, Cr, Ti, Pd, Co, Si, Ta, W, Mo or Ge, or an alloy thereof as a primary constituent, for example, can be given as a material composing the reflecting layer 11. Of those materials, especially, the Al system material, the Ag system material, the Au system material, the Si system material, or the Ge system material is preferred in terms of usefulness. With regard to the alloy, for example, Al—Ti, Al—Cr, Al—Cu, Al—Mg—Si, Ag—Nd—Cu, Ag—Pd—Cu, Ag—Pd—Ti, Si—B or the like is suitably used. With regard to the material composing the reflecting layer 11, the suitable material is preferably selected from those materials in consideration of the optical characteristics and the thermal characteristics. For example, when a respect of having the high reflectivity in the single wavelength region as well is taken into consideration, either the Al system material or the Ag system material is preferably used as the material composing the reflecting layer 11.

The first dielectric layer 13, the second dielectric layer 12, the first dielectric layer 15, the second dielectric layer 16, and the third dielectric layer 17 are the layers for protecting the recording layer 14, and controlling the optical characteristics, the thermal stability, and the like. An oxide of Si, In, Zr, Cr, Sn, Ta, Al, Nb or the like, a nitride of Si, Al or the like, a sulfide of Zn or the like, or a material obtained by mixing two or more kinds of dielectric materials described above with each other, for example, can be used as the dielectric materials composing the first dielectric layer 13, the second dielectric layer 12, the first dielectric layer 15, the second dielectric layer 16, and the third dielectric layer 17. Specifically, SiN, ZnS—SiO$_2$, AlN, Al$_2$O$_3$, SiO$_2$, Cr$_2$O$_3$, In$_2$O$_3$, ZrO$_2$, SiO$_2$—In$_2$O$_3$—ZrO$_2$ (hereinafter suitably referred to as "SIZ"), SiO$_2$—Cr$_2$O$_3$—ZrO$_2$ (hereinafter suitably referred to as "SCZ"), TiO$_2$, Nb$_2$O$_5$ or the like can be used as the dielectric materials composing the first dielectric layer 13, the second dielectric layer 12, the first dielectric layer 15, the second dielectric layer 16, and the third dielectric layer 17. In addition, the first dielectric layer 13 and the first dielectric layer 15 may be made of materials different from each other. Also, the second dielectric layer 12 and the second dielectric layer 16 may be made of materials different from each other.

The recording layer 14, for example, is a recording layer in which the information signal can be repetitively recorded by radiating thereto laser beam. Specifically, the recording layer 14, for example, is a phase-change recording layer in which an amorphous phase and a crystalline phase are reversibly changed over to each other by the radiation of the laser beam, thereby recording and rewriting the information signal in and to the phase-change recording layer. Either an eutectic system phase-change material or a compound system phase-change material, for example, can be used as the material for the phase-change recording layer. Specifically, a phase-change material containing therein GeSbTe, SbTe, BiGeTe, BiGeSbTe, AgInSbTe, GeSnSbTe or the like as a primary constituent, for example, is given as the phase-change material. In addition, one or more kinds of metallic materials such as Ag, In, Cr, and Mn may be added to the phase-change material containing therein these materials as the primary constituents as may be necessary.

Intermediate Layer

The intermediate layer 3 serving as the resin layer and having a thickness of, for example, 25 μm is formed on the first information recording layer 2 formed on the substrate 1. The intermediate layer 3 is made of a resin material having transparency. In this case, a plastic material such as a polycarbonate system resin, a polyolefin system resin or an acrylic resin, for example, can be used as the resin material for the intermediate layer 3. A surface of the intermediate layer 3 on the cover layer 5 side is a concave-convex surface including the in-groove Gin and the on-groove Gon, for example, similarly to the case of the substrate 1. The second information recording layer 4 is deposited on the concave-convex surface of the intermediate layer 3.

Various kinds of shapes such as a spiral shape and a concentric shape are given as the shapes of the in-groove Gin having the concave shape and the on-groove Gon having the convex shape. In addition, the in-groove Gin and/or the on-groove Gon, for example, is wobbled (snaked) in order to add address information.

Second Information Recording Layer

Figure 3:
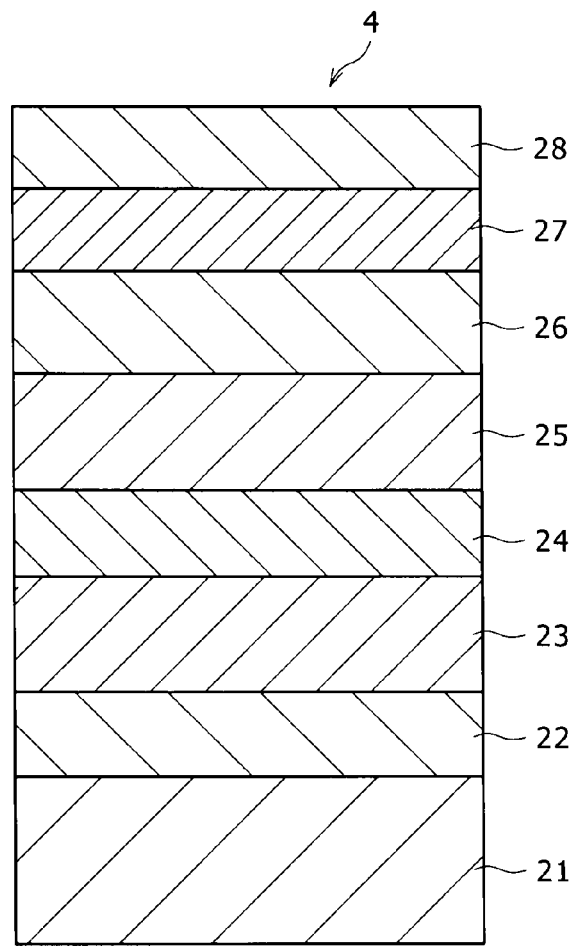
FIG. 3 is a cross sectional view showing a structure of a second information recording layer of the optical recording medium according to the first embodiment of the present invention.

FIG. 3 shows a structure of the second information recording layer. As shown in FIG. 3, the second information recording layer 4, for example, is made from a lamination film in which a transmittance adjusting layer 21, a reflecting layer 22, a second dielectric layer 23, a first dielectric layer 24, a recording layer 25, a first dielectric layer 26, a second dielectric layer 27, and a third dielectric layer 28 are laminated in this order on the intermediate layer 3.

The transmittance adjusting layer 21 is a layer for amplifying a transmittance of the second information recording layer (L1 layer). A high-refractive index material such as TiO$_2$ or Nb$_2$O$_5$, for example, can be used as a material composing the transmittance adjusting layer 21.

The reflecting layer 22 is a layer for enhancing the optical characteristics by reflecting the laser beam made incident thereto, and quickly releasing the heat absorbed in the recording layer 25. A material containing therein an elementary substance such as Al, Ag, Au, Ni, Cr, Ti, Pd, Co, Si, Ta, W, Mo or Ge, or an alloy thereof as a primary constituent, for example, can be given as a material composing the reflecting layer 22. Of those materials, especially, the Al system material, the Ag system material, the Au system material, the Si system material, or the Ge system material is preferred in terms of usefulness. With regard to the alloy, for example, Al—Ti, Al—Cr, Al—Cu, Al—Mg—Si, Ag—Pd—Cu, Ag—Pd—Ti, Si—B or the like is suitably used. With regard to the material composing the reflecting layer 22, the suitable material is preferably selected from those materials in consideration of the optical characteristics and the thermal characteristics. For example, when a respect of having the high reflectivity in the single wavelength region is taken into consideration, either the Al system material or the Ag system material is preferably used as the material composing the reflecting layer 22.

The first dielectric layer 24, the second dielectric layer 23, the first dielectric layer 26, the second dielectric layer 27, and the third dielectric layer 28 are the layers for protecting the recording layer 25, and controlling the optical characteristics, the thermal stability, and the like. An oxide of Si, In, Zr, Cr, Sn, Ta, Al, Nb or the like, a nitride of Si, Al or the like, a sulfide of Zn or the like, or a material obtained by mixing two or more kinds of dielectric materials described above with each other, for example, can be used as the dielectric materials composing the first dielectric layer 24, the second dielectric layer 23, the first dielectric layer 26, the second dielectric layer 27, and the third dielectric layer 28. Specifically, SiN, ZnS—SiO$_2$, AlN, Al$_2$O$_3$, SiO$_2$, Cr$_2$O$_3$, In$_2$O$_3$, ZrO$_2$, SCZ, SIZ, TiO$_2$, Nb$_2$O$_5$ or the like can be used as the dielectric materials composing the first dielectric layer 24, the second dielectric layer 23, the first dielectric layer 26, the second dielectric layer 27, and the third dielectric layer 28. In addition, the first dielectric layer 24 and the first dielectric layer 26 may be made of materials different from each other. Also, the second dielectric layer 23 and the second dielectric layer 27 may be made of materials different from each other.

A thermal conductivity of the second dielectric layer 23 adjacent to the reflecting layer 22 is set as being higher than that of the first dielectric layer 24 adjacent to the recording layer 25. As a result, the heat of the recording layer 25 heated by the radiation of the laser beam can be quickly released to the Ag alloy, thereby making it possible to enhance the repetitive recording durability of the second information recording layer 4. When each of the first dielectric layer 24 and the second dielectric layer 23 contains therein SiO$_2$, In$_2$O$_3$ and ZrO$_2$ as the primary constituents, preferably, ratios of In$_2$O$_3$ contained in the first dielectric layer 24 and the second dielectric layer 23 meet the following relationship. That is to say, when the ratio of In$_2$O$_3$ contained in the first dielectric layer 24 adjacent to the recording layer 25 is a mol % and the ratio of In$_2$O$_3$ contained in the second dielectric layer 23 adjacent to the reflecting layer 22 is b mol %, preferably, a relationship of a<b is met. By meeting such a relationship, the thermal conductivity of the second dielectric layer 23 can be set as being higher than that of the first dielectric layer 24. Here, with regard to the ratio, a total amount of SiO$_2$, In$_2$O$_3$ and ZrO$_2$ contained either in the first dielectric layer 24 or in the second dielectric layer 23 is set as 100 mol %. Also, the thermal conductivity is a thermal conductivity in a thickness direction of a film.

Specifically, when each of the first dielectric layer 24 and the second dielectric layer 23 contains therein SiO$_2$, In$_2$O$_3$ and ZrO$_2$ as the primary constituents, preferably, the first dielectric layer 24 has a composition expressed by a composition formula (1):

$$(SiO_2)_{x1}(In_2O_3)_{y1}(ZrO_2)_{z1} \quad (1)$$

where x1+y1+z1=100, 5≦x1≦20, 40≦y1≦60, and 30≦z1≦50.

Also, preferably, the second dielectric layer 23 has a composition expressed by a composition formula (2):

$$(SiO_2)_{x2}(In_2O_3)_{y2}(ZrO_2)_{z2} \quad (2)$$

where x2+y2+z2=100, 5≦x2≦20, 60≦y2≦90, and 5≦z2≦20.

The recording layer 25, for example, is a recording layer in which the information signal can be repetitively recorded by radiating thereto the laser beam. Specifically, the recording layer 25, for example, is a phase-change recording layer in which an amorphous phase and a crystalline phase are reversibly changed over to each other by the radiation of the laser beam, thereby recording and rewriting the information signal in and to the phase-change recording layer. Either an eutectic system phase-change material or a compound system phase-change material, for example, can be used as the material for the phase-change recording layer. Specifically, a phase-change material containing therein GeSbTe, SbTe, BiGeTe, BiGeSbTe, AgInSbTe, GeSnSbTe or the like as a primary constituent, for example, is given as the phase-change material. In addition, one or more kinds of metallic materials such as Ag, In, Cr, and Mn may be added to the phase-change material containing therein these materials as the primary constituents, as may be necessary.

Preferably, the phase-change recording layer containing therein the eutectic phase-change material as the primary constituent is used as the recording layer 14 of the first information recording layer 2, and the phase-change recording layer containing therein the compound system phase-change material as the primary constituent is used as the recording layer 25 of the second information recording layer 4. When such a structure is adopted, preferably, a GeSbTe system material is used as the eutectic phase-change material, and a BiGeTe system material is used as the compound system phase-change material. The reason for this is because the recording layer 14 and the recording layer 25 having the structures described above are combined with each other, thereby making it possible to enhance the recording characteristics.

Preferably, the BiGeTe system material as the compound system phase-change material has a composition expressed by a composition formula (3):

$$Bi_xGe_yTe_z \quad (3)$$

where x+y+z=100, 2≦x≦100, 35≦y≦45, and 45≦z≦55.

Cover Layer

The cover layer 5 serving as the protective layer, for example, is a resin layer obtained by curing a photosensitive resin such as an ultraviolet curable resin. An ultraviolet cure type acrylic resin, for example, is given as a material for the resin layer. In addition, the cover layer 5 may be composed of a light transmissive sheet having a toric shape, and an adhesion layer with which the light transmissive sheet is stuck to the substrate 1. The light transmissive sheet is preferably made of a material having a low absorption ability for the laser beam used for the recording and the reproducing. Specifically, the light transmissive sheet is preferably made of a material having a transmittance of 90% or more. A polycarbonate system resin material or a polyolefin system resin such as ZEONEX (registered trademark), for example, is given as the material for the light transmissive sheet. A thickness of the light transmissive sheet is preferably selected as 0.3 mm or less, and more preferably is selected from the range of 3 to 177 μm. Also, the adhesive layer, for example, is made of either an ultraviolet curable resin or a Pressure Sensitive Adhesive (PSA).

A thickness of the cover layer 5 is preferably selected from the range of 10 to 177 μm, and, for example, is selected as 100 μm. Such a thin cover layer 5 and an objective lens, for example, having a highly increased Numerical Aperture (NA)

of about 0.85 are combined with each other, thereby making it possible to realize the high-density recording.

Method of Manufacturing Optical Recording Medium

Next, a description will be given with respect to a method of manufacturing the optical recording medium having the structure described above.

Firstly, the substrate 1 is obtained through shaping by, for example, utilizing an injection method, a Photo Polymerization method (2P method) or the like. Next, for example, the reflecting layer 11, the second dielectric layer 12, the first dielectric layer 13, the recording layer 14, the first dielectric layer 15, the second dielectric layer 16, and the third dielectric layer 17 are laminated in this order on the substrate 1. As a result, the first information recording layer 2 is formed on the substrate 1. A vacuum thin film forming technique such as a sputtering method or a vacuum evaporation method, for example, can be used as the method of forming these thin films.

Next, an ultraviolet curable resin is uniformly applied onto the first information recording layer 2 by, for example, utilizing a spin coat method. After that, a stamper having a predetermined concave-convex pattern is pressed against the ultraviolet curable resin uniformly applied to the first information recording layer 2, and the ultraviolet curable resin is then cured by radiating thereto an ultraviolet light. After that, the stamper having the predetermined concave-convex pattern is peeled off from the ultraviolet curable resin thus cured. As a result, the predetermined concave-convex pattern of the stamper is transferred onto the ultraviolet curable resin, thereby forming the intermediate layer 3, for example, having the in-groove Gin and the on-groove Gon formed thereon.

Next, the transmittance adjusting layer 21, the reflecting layer 22, the second dielectric layer 23, the first dielectric layer 24, the recording layer 25, the first dielectric layer 26, the second dielectric layer 27, and the third dielectric layer 28, for example, are laminated in this order on the intermediate layer 3. As a result, the second information recording layer 4 is formed on the intermediate layer 3. The vacuum thin film forming technique such as the sputtering method or the vacuum evaporation method, for example, can be used as the method of forming these thin films.

Next, the cover layer 5 serving as the protective layer is formed on the second information recording layer 4. A method in which the photosensitive resin such as the ultraviolet curable resin is applied onto the cover layer 5 by utilizing the spin coat method, and the light such as the ultraviolet light is radiated to the photosensitive resin, thereby forming the cover layer 5, for example, can be used as a method of forming the cover layer 5. Alternatively, a method in which a light transmissive sheet is stuck onto the concave-convex surface side on the substrate 1 by using an adhesive agent, thereby forming the cover layer 5 is used as the method of forming the cover layer 5. Specifically, a method in which a light transmissive sheet is stuck onto the concave-convex surface side on the substrate 1 by using a photosensitive resin such as the ultraviolet curable resin applied to the second information recording layer 4, thereby forming the cover layer 5 can be used as the method of forming the cover layer 5. Or, a method in which the light transmissive sheet is stuck onto the concave-convex surface side on the substrate 1 by using the pressure sensitive adhesive (PSA) previously uniformly applied onto a principal surface of the light transmissive sheet, thereby forming the cover layer 5 can also be used as the method of forming the cover layer 5.

The optical recording medium shown in FIG. 1 is obtained in the processes described above.

As described above, in the first embodiment of the present invention, the thermal conductivity of the second dielectric layer 23 adjacent to the reflecting layer 22 is made higher than that of the first dielectric layer 24 adjacent to the recording layer 25. As a result, the heat of the recording layer 25 heated by the radiation of the laser beam can be quickly released to the reflecting layer 22, thereby enhancing the repetitive recording durability of the second information recording layer 4. That is to say, the repetitive recording durability can be enhanced in the multi-layer rewritable optical recording medium.

In addition, even when the thickness of the reflecting layer 22 is thinned for the purpose of controlling the transmittance of the second information recording layer 4 through which the laser beam is transmitted, the heat of the recording layer 25 heated by the radiation of the laser beam can be quickly released to the reflecting layer 22. Therefore, the repetitive recording durability can be enhanced in the multi-layer rewritable optical recording medium.

In addition, when the first dielectric layer 24 and the second dielectric layer 23 each containing therein $SiO_2$, $In_2O_3$ and $ZrO_3$ as the primary constituents, the thermal conductivities of the first dielectric layer 24 and the second dielectric layer 23 can be readily controlled by adjusting the ratios of $In_2O_3$ in the first dielectric layer 24 and the second dielectric layer 23. Specifically, when the ratio of $In_2O_3$ contained in the first dielectric layer 24 adjacent to the recording layer 25 is a mol %, and the ratio of $In_2O_3$ contained in the second dielectric layer 23 adjacent to the reflecting layer 22 is b mol %, preferably, the ratios of $In_2O_3$ in the first dielectric layer 24 and the second dielectric layer 23 are set so as to meet the relationship of a<b. The reason for this is because by setting the ratios of $In_2O_3$ in the first dielectric layer 24 and the second dielectric layer 23 in such a manner, the thermal conductivity of the second dielectric layer 23 adjacent to the reflecting layer 22 can be made higher than that of the first dielectric layer 24 adjacent to the recording layer 25.

In addition, preferably, the layer containing therein $SiO_2$, $In_2O_3$ and $ZrO_2$ as the primary constituents is used as each of the first dielectric layer 24 and the second dielectric layer 23, and the layer containing therein Bi, Ge and Te as the primary constituents is used as the recording layer 25. By adopting such layers, the creation of the crystal in the recording layer 25 can be controlled, thereby obtaining the more satisfactory signal characteristics.

2. Second Embodiment

An optical recording medium according to a second embodiment of the present invention is different from the optical recording medium of the first embodiment in that the optical recording medium of the second embodiment has a single information recording layer. It is noted that the same portions as those in the first embodiment described above are designated by the same reference numerals, respectively, and a description thereof is omitted here for the sake of simplicity.

Figure 4:
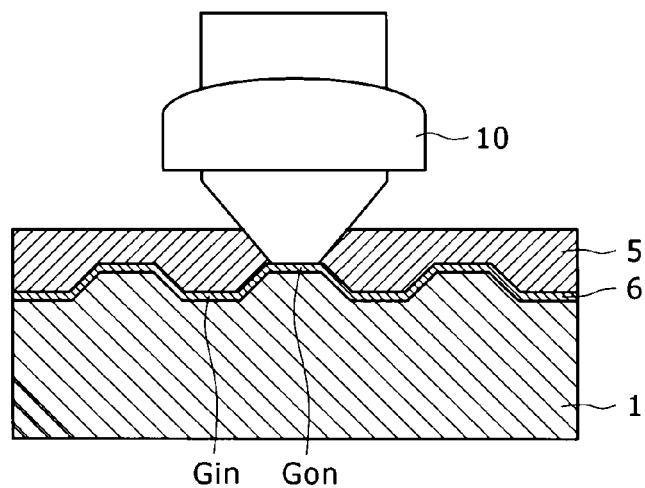
FIG. 4 is a cross sectional view showing a structure of an optical recording medium according to a second embodiment of the present invention.

FIG. 4 shows a structure of the optical recording medium according to the second embodiment of the present invention. As shown in FIG. 4, the optical recording medium of the second embodiment has a structure in which an information recording layer 6 and the cover layer 5 serving as the protective layer are laminated in this order on the substrate 1.

Figure 5:
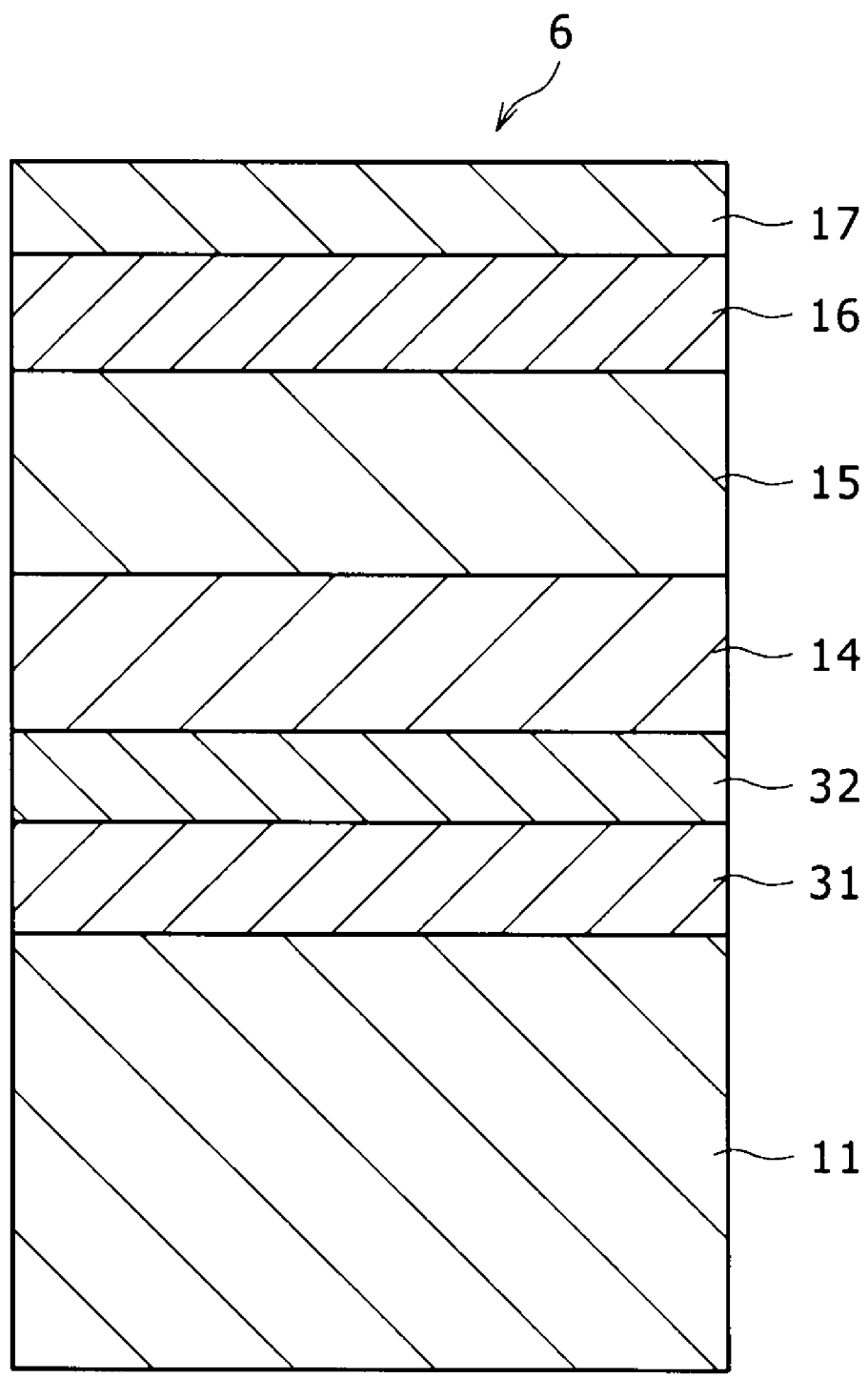
FIG. 5 is a cross sectional view showing a structure of an information recording layer of the optical recording medium according to the second embodiment of the present invention.

FIG. 5 shows a structure of the information recording layer in the optical recording medium of the second embodiment. As shown in FIG. 5, the information recording layer 6 includes a first dielectric layer 32 and a second dielectric layer 31 each provided between the reflecting layer 11 and the recording layer 14. The first dielectric layer 32 and the second dielectric layer 31 are identical to the first dielectric layer 24 and the second dielectric layer 23 of the second information recording layer 4 in the optical recording medium of the first embodiment, respectively.

According to the second embodiment of the present invention, the repetitive recording durability can be enhanced in the rewritable optical recording medium having the single information recording layer 6.

3. Third Embodiment

Since an optical recording medium according to a third embodiment of the present invention has the same structure as that of the recording medium of the first embodiment described above except for a second information recording layer, hereinafter, this second information recording layer will be described. It is noted that the same portions as those in the first embodiment described above are designated by the same reference numerals, respectively, and a description thereof is omitted here for the sake of simplicity.

Figure 6:
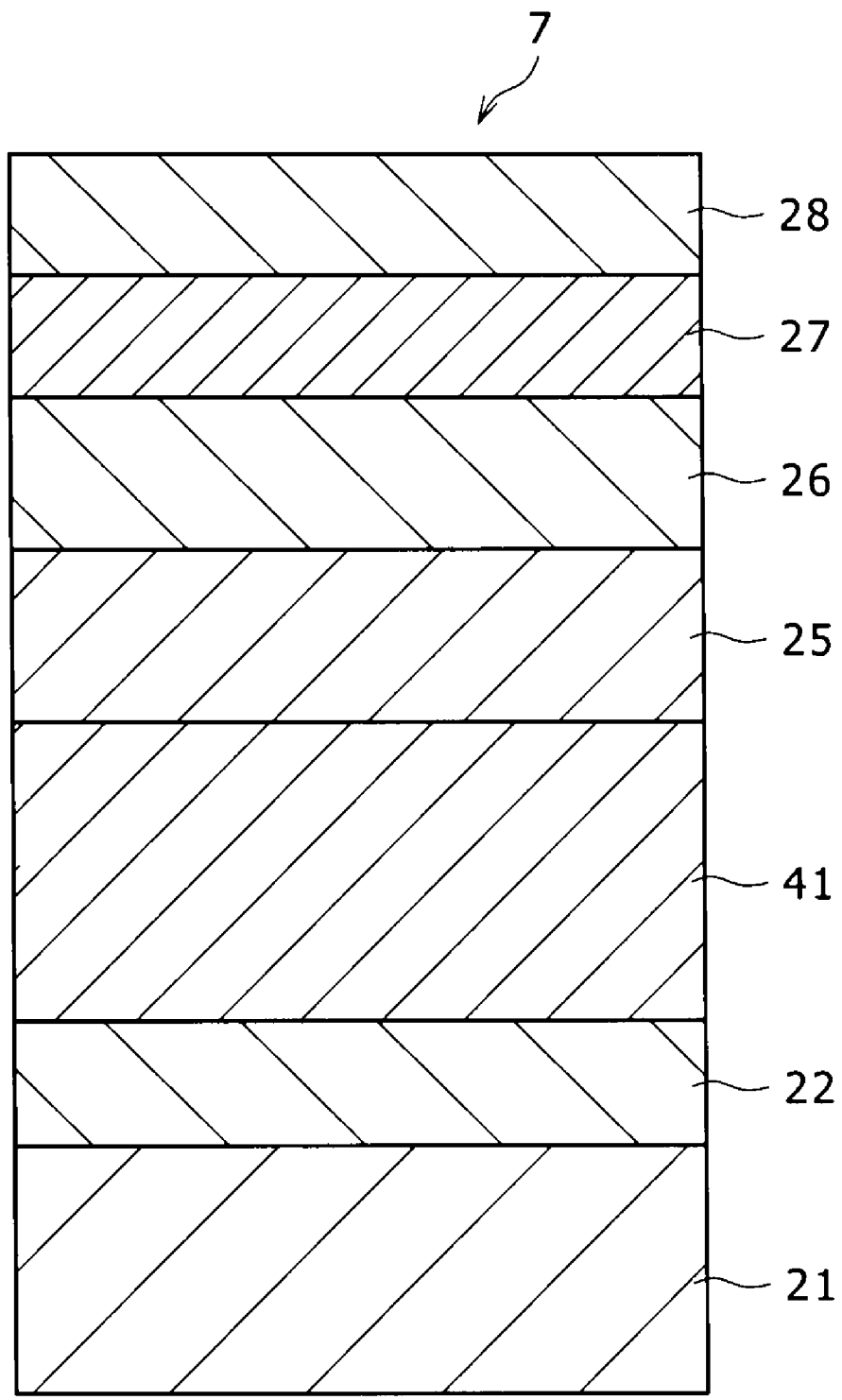
FIG. 6 is a cross sectional view showing a structure of a second information recording layer of an optical recording medium according to a third embodiment of the present invention.

FIG. 6 shows a structure of the second information recording layer of the optical recording medium according to the third embodiment of the present invention. As shown in FIG. 6, the second information recording layer 7 in the optical recording medium of the third embodiment is different from the second information recording layer 4 in the optical recording medium of the first embodiment in that the second information recording layer 7 includes a single dielectric layer 41 between the reflecting layer 22 and the recording layer 25.

The dielectric layer 41 contains therein $SiO_2$, $In_2O_3$ and $ZrO_2$ as the primary constituents. Preferably, a ratio of $In_2O_3$ contained in the dielectric layer 41 is in the range of 40 to 60 mol %. Here, with regard to the ratio, a total amount of $SiO_2$, $In_2O_3$ and $ZrO_2$ contained in the dielectric layer 41 is set as 100 mol %. More specifically, preferably, the dielectric layer 41 has a composition expressed by a composition formula (4):

$$(SiO_2)_{x1}(In_2O_3)_{y1}(ZrO_2)_{z1} \quad (4)$$

where $x1+y1+z1=100$, $5 \leqq x1 \leqq 20$, $40 \leqq y1 \leqq 60$, and $30 \leqq z1 \leqq 50$.

Preferably, the recording layer 25 contains therein the BiGeTe system material, as the compound system phase-change material, as the primary constituent. The reason for this is because the recording layer 25 containing therein the BiGeTe system material, and the dielectric layer 41 containing therein $SiO_2$, $In_2O_3$ and $ZrO_2$ as the primary constituents are combined with each other, thereby making it possible to control the creation of the crystal in the recording layer 25, and to obtain the satisfactory signal characteristics.

In the third embodiment, the single dielectric layer 41 containing therein $SiO_2$, $In_2O_3$ and $ZrO_2$ as the primary constituents is formed between the reflecting layer 22 and the recording layer 25. As a result, the heat of the recording layer 25 heated by the radiation of the laser beam can be quickly released to the reflecting layer 22, thereby making it possible to enhance the repetitive recording durability of the second information recording layer 7. In addition, the productivity can be enhanced because the number of laminated dielectric layers can be reduced by one layer as compared with the case of the first embodiment.

4. Fourth Embodiment

Figure 7:
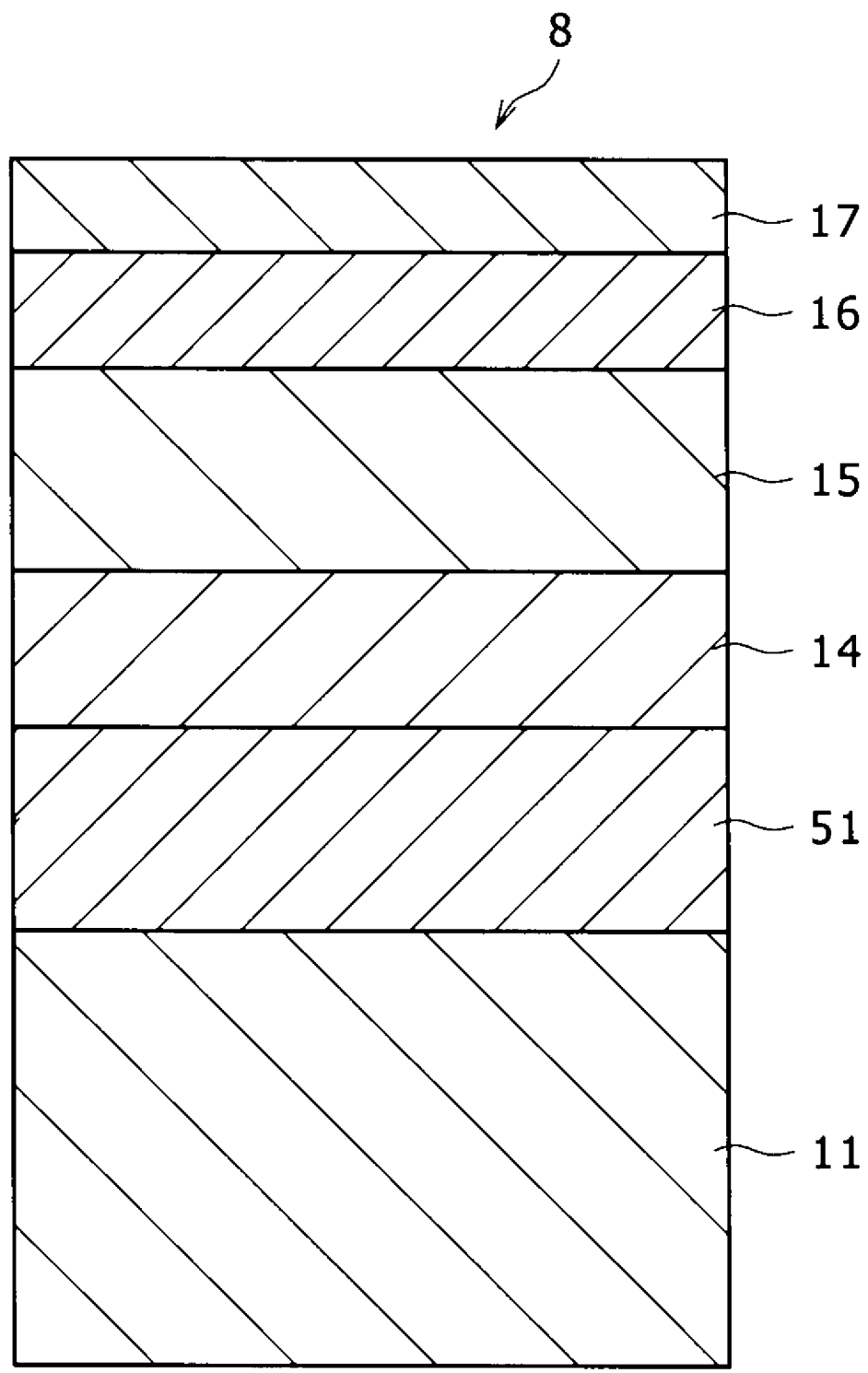
FIG. 7 is a cross sectional view showing a structure of an information recording layer of an optical recording medium according to a fourth embodiment of the present invention.

FIG. 7 shows a structure of an information recording layer of an optical recording medium according to a fourth embodiment of the present invention. It is noted that the same portions as those in the second embodiment described above are designated by the same reference numerals, respectively, and a description thereof is omitted here for the sake of simplicity. As shown in FIG. 7, the optical recording medium according to the fourth embodiment of the present invention is different from the optical recording medium of the second embodiment in that the optical recording medium has an information recording layer 8 having a single dielectric layer 51 formed between the reflecting layer 11 and the recording layer 14. The dielectric layer 51 is identical to the dielectric layer 41 in the third embodiment.

According to the fourth embodiment of the present invention, the repetitive recording durability can be enhanced in the rewritable optical recording medium having the single information recording layer 8. In addition, the productivity can be enhanced because the number of laminated dielectric layers can be reduced by one layer as compared with the case of the second embodiment.

EXAMPLES

Although hereinafter, the present invention will be concretely described based on Examples, the present invention is by no means limited only to Examples.

1. Study about Thermal Conductivity

Firstly, the thermal conductivities of $SiO_2$, $In_2O_3$, $ZrO_2$, and $SiO_2$—$In_2O_3$—$ZrO_2$ were studied.

Test Example 1

A thin film (dielectric film) made of $SiO_2$ was formed on a substrate by utilizing a sputtering method.

Test Example 2

A thin film (dielectric film) made of $In_2O_3$ was formed on a substrate by utilizing the sputtering method.

Test Example 3

A thin film (dielectric film) made of $ZrO_2$ was formed on a substrate by utilizing the sputtering method.

Test Example 4

A thin film (dielectric film) made of $SiO_2$—$In_2O_3$—$ZrO_2$ was formed on a substrate by utilizing the sputtering method. By the way, the preparation was carried out so that the composition ratios of the thin film become $SiO_2$:$In_2O_3$:$ZrO_2$=15 mol %:30 mol %:55 mol %.

Test Example 5

A thin film (dielectric film) made of $SiO_2$—$In_2O_3$—$ZrO_2$ was formed on a substrate by utilizing the sputtering method. By the way, the preparation was carried out so that the composition ratios of the thin film become $SiO_2$:$In_2O_3$:$ZrO_2$=15 mol %:50 mol %:35 mol %.

Test Example 6

A thin film (dielectric film) made of $SiO_2$—$In_2O_3$—$ZrO_2$ was formed on a substrate by utilizing the sputtering method. By the way, the preparation was carried out so that the composition ratios of the thin film become $SiO_2$:$In_2O_3$:$ZrO_2$=15 mol %:70 mol %:15 mol %.

Measurement about Thermal Conductivity

The thermal conductivities of these thin films formed in the manner as described above were measured by using TCN-2ω, as a measuring apparatus, manufactured by ULVAC-RIKO Co., Ltd. TABLE 1 shows the measurement results.

TABLE 1

| | material | thermal conductivity (W/mK) |
|---|---|---|
| test example 1 | $SiO_2$ | 0.56 |
| test example 2 | $In_2O_3$ | 1.31 |
| test example 3 | $ZrO_2$ | 0.88 |
| test example 4 | $(SiO_2)_{15}(In_2O_3)_{30}(ZrO_2)_{55}$ (mol %) | 0.85 |
| test example 5 | $(SiO_2)_{15}(In_2O_3)_{50}(ZrO_2)_{35}$ (mol %) | 0.95 |
| test example 6 | $(SiO_2)_{15}(In_2O_3)_{70}(ZrO_2)_{15}$ (mol %) | 1.10 |

The following contents can be seen from TABLE 1.

It is understood that the thermal conductivity of $In_2O_3$ of $SiO_2$, $In_2O_3$ and $ZrO_2$ is as highest as 1.31 W/mK. In addition, in the composite dielectric made of $SiO_2$—$In_2O_3$—$ZrO_2$, it is understood that the thermal conductivity becomes high with an increase in ratio of $In_2O_3$.

2. Study about Recording Durability

Next, the two dielectric layers were each formed between the recording layer and the reflecting layer in the second information recording layer (L1 layer), and the durability of the optical recording medium was studied while the thermal conductivities of these dielectric layers were each changed.

Example 1

Firstly, a polycarbonate substrate having a groove with a diameter of 120 mm, a thickness of 1.1 mm, and a track pitch of 0.32 μm was formed. Next, a reflecting layer, a second dielectric layer, a first dielectric layer, a recording layer, a first dielectric layer, and a second dielectric layer which had the following compositions and thicknesses, respectively, were laminated in order on the polycarbonate substrate by utilizing a magnetron sputtering system. As a result, a first information recording layer (L0 layer) was formed on the substrate.

second dielectric layer: SiN, 40 nm
first dielectric layer: ZnS—$SiO_2$, 10 nm
recording layer: GeSbTe, 12 nm
first dielectric layer: ZnS—$SiO_2$, 5 nm
second dielectric layer: SiN, 5 nm
reflecting layer: Ag alloy, 100 nm Next, an ultraviolet curable resin was uniformly applied onto the first information recording layer by, for example, utilizing the spin coat method. After that, a stamper having a predetermined concave-convex pattern was pressed against the ultraviolet curable resin uniformly applied to the first information recording layer (L0 layer), and the ultraviolet curable resin was then cured by radiating thereto an ultraviolet light. After that, the stamper was peeled off from the ultraviolet curable resin thus cured. As a result, an intermediate layer having a groove with a thickness of 25 μm and a track pitch of 0.32 μm was formed on the first information recording layer (L0 layer). Next, a transmittance adjusting layer, a reflecting layer, a second dielectric layer, a first dielectric layer, a recording layer, a first dielectric layer, a second dielectric layer, and a third dielectric layer which had the following compositions and thicknesses, respectively, were laminated in order on the resulting intermediate layer by utilizing the magnetron sputtering system. As a result, a second information recording layer (L1 layer) was formed on the intermediate layer.

third dielectric layer: SiN, 30 nm
second dielectric layer: ZnS—$SiO_2$, 10 nm
first dielectric layer: $SiO_2$—$Cr_2O_3$—$ZrO_2$, 2 nm
recording layer: $Bi_8Ge_{40}Te_{52}$, 6 nm
transmittance adjusting layer: $TiO_2$, 20 nm
first dielectric layer: $SiO_2$—$In_2O_3$—$ZrO_2$, 2 nm (where the composition ratios of $SiO_2$—$In_2O_3$—$ZrO_2$ is $SiO_2$:$In_2O_3$:$ZrO_2$=15 mol %:50 mol %:35 mol %)
second dielectric layer: $SiO_2$—$In_2O_3$—$ZrO_2$, 8 nm (where the composition ratios of $SiO_2$—$In_2O_3$—$ZrO_2$ is $SiO_2$:$In_2O_3$:$ZrO_2$=15 mol %:70 mol %:15 mol %)
reflecting layer: Ag alloy, 10 nm Next, a light transmissive layer made of an ultraviolet curable resin and having a thickness of 75 μm was formed on the first information recording layer (L1 layer) by utilizing the spin coat method.

The desired optical recording medium was obtained in the processes described above.

Example 2

An optical recording medium was obtained similarly to the case of Example 1 except that the preparation was carried out so that composition ratios of $SiO_2$—$In_2O_3$—$ZrO_2$ contained in the dielectric layer located on the opposite side became $SiO_2$: $In_2O_3$: $ZrO_2$=15 mol %:50 mol %:35 mol %.

Comparative Example 1

An optical recording medium was obtained similarly to the case of Example 1 except that the preparation was carried out so that composition ratios of $SiO_2$—$In_2O_3$—$ZrO_2$ contained in the dielectric layer located on the opposite side became $SiO_2$:$In_2O_3$:$ZrO_2$=15 mol %:30 mol %:55 mol %.

Comparative Example 2

An optical recording medium was obtained similarly to the case of Example 1 except that a single dielectric layer made of $SiO_2$ and having a thickness of 10 nm was formed between the reflecting layer and the recording layer in the second information signal layer.

Comparative Example 3

An optical recording medium was obtained similarly to the case of Example 1 except that a single dielectric layer made of $In_2O_3$ and having a thickness of 10 nm was formed between the reflecting layer and the recording layer in the second information signal layer.

Comparative Example 4

An optical recording medium was obtained similarly to the case of Example 1 except that a single dielectric layer made of $ZrO_2$ and having a thickness of 10 nm was formed between the reflecting layer and the recording layer in the second information signal layer.

Comparative Example 5

An optical recording medium was obtained similarly to the case of Example 1 except that a first dielectric layer and a second dielectric layer having the following compositions and thicknesses, respectively, were formed between the reflecting layer and the recording layer in the second information signal layer.

first dielectric layer: ZnS—SiO$_2$, 2 nm
second dielectric layer: SiN, 8 nm

Evaluation about Recording Durability

Figure 8:
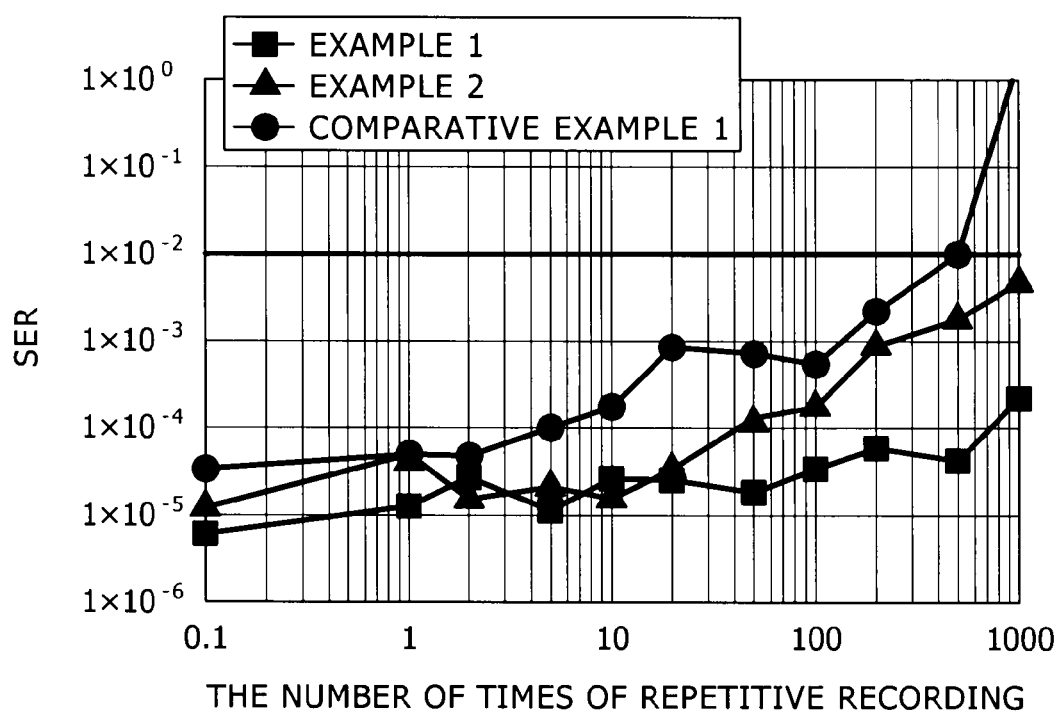
FIG. 8 is a graph showing repetitive recording durabilities of optical recording media of Examples 1 and 2, and Comparative Example 1, respectively.

The evaluations about the recording durabilities of the optical recording media of Examples 1 and 2, and Comparative Example 1 obtained in the manners described above were carried out as follows. A symbol Error Rate (SER) when a random pattern having the shortest recording mark length of 0.149 µm was repetitively recorded was measured by using a measuring apparatus equipped with an optical system adapted to a wavelength of 400 nm and having an NA of 0.85. FIG. 8 shows the measurement results of the symbol error rate (SER). In FIG. 8, an axis of abscissa represents the number of times of the repetition, and an axis of ordinate represents the symbol error rate (SER). It should be noted that in a graph shown in FIG. 8, a straight line representing the symbol error rate=$1\times10^{-2}$ shows a reference value for the symbol error rate (SER). That is to say, when the symbol error rate exceeds this reference value, an error correction becomes difficult in a general drive device or the like.

It should be noted that since in the optical recording media of Comparative Examples 2 to 5, the recording characteristics, and the corrosion reliability under the preservation environment were remarkably deteriorated, the evaluation about the recording durabilities of the optical recording media of Comparative Examples 2 to 5 was not carried out.

The following contents can be seen from FIG. 8. In Example 1, even when the number of times of the repetition reaches 1,000 times, the SER largely falls below $1\times10^{-2}$ as the reference value above which the error may not be corrected. Therefore, it is possible to ensure the recording durability having a sufficient room, including the dispersion of the manufacture. In addition, in Example 2 as well, when the number of times of the repetition reaches 1,000 times, the SER largely falls below $1\times10^{-2}$ as the reference value above which the error may not be corrected. Therefore, it is possible to ensure the satisfactory recording durability. The reason that the satisfactory durability can be ensured in such a manner in each of Examples 1 and 2 is because in each of Examples 1 and 2, the heat generated in the phase-change recording layer can be quickly released to the Ag alloy layer.

On the other hand, in Comparative Example 1, when the number of times of the repetition reaches 1,000 times, the SER is largely more than $1\times10^{-2}$ as the reference value above which the error may not be corrected. Therefore, it is difficult to ensure the recording durability. The reason that the satisfactory durability may not be ensured in such a manner in Comparative Example 1 is because in Comparative Example 1, the heat generated in the phase-change recording layer may not be quickly released to the Ag alloy layer.

The following can be seen when the above results are summed up.

In the second information signal layer, the thermal conductivity of the second dielectric layer located on the reflecting side is made larger than that of the first dielectric layer located on the recording layer side, thereby making it possible to enhance the repetitive recording characteristics of the second information signal layer.

In the optical recording medium including the single information recording layer, the repetitive recording characteristics of the single information recording layer can be enhanced even when the first dielectric layer and the second dielectric layer are each formed between the recording layer and the reflecting layer, and the thermal conductivity of the second dielectric layer located on the reflecting layer side is made larger than that of the first dielectric layer located on the recording layer side. The fact that such an effect is obtained even in the optical recording medium including the single information recording layer can be readily guessed because the repetitive recording characteristic is enhanced even in the multi-layer optical recording medium including the reflecting layer (the reflecting layer of the second information recording layer) having the thin thickness and the low radiation property as compared with the case of the optical recording medium including the single information recording layer.

Even when in the first information signal layer, the thermal conductivity of the second dielectric layer located on the reflecting layer side is made larger than that of the first dielectric layer located on the recording layer side, similarly, it is possible to enhance the repetitive recording characteristics.

When each of the first dielectric layer and the second dielectric layer contains therein SiO$_2$—In$_2$O$_3$—ZrO$_2$ as the primary constituents, preferably, the ratio of In$_2$O$_3$ contained in the second dielectric layer is larger than that of In$_2$O$_3$ contained in the first dielectric layer. As a result, the thermal conductivity of the second dielectric layer located on the reflecting layer side can be made larger than that of the first dielectric layer located on the recording layer side, thereby making it possible to obtain the satisfactory repetitive recording characteristics.

The single dielectric layer containing therein SiO$_2$—In$_2$O$_3$—ZrO$_2$ as the primary constituent is formed between the recording layer and the reflecting layer, thereby making it possible to obtain the satisfactory repetitive recording characteristics.

The first dielectric layer and the second dielectric layer each containing therein the composite dielectric made of SiO$_2$—In$_2$O$_3$—ZrO$_2$ as the primary constituent, and the recording layer containing therein the BiGeTe system material as the primary constituent are preferably combined with each other. The recording layer, and the first dielectric layer and the second dielectric layer having such structures, respectively, are combined with each other, thereby obtaining the satisfactory recording characteristics. In addition, even when the single dielectric layer containing therein the composite dielectric made of SiO$_2$—In$_2$O$_3$—ZrO$_2$ as the primary constituent, and the recording layer containing therein the BiGeTe system material as the primary constituent are combined with each other, similarly, it is possible to obtain the satisfactory recording characteristics.

The first information recording layer including the recording layer containing therein the GeSbTe system material as the primary constituent, and the second information recording layer including the recording layer containing therein the BiGeTe system material as the primary constituent are combined with each other, thereby making it possible to obtain the satisfactory recording characteristics.

Although the embodiments and Examples thereof of the present invention have been concretely described so far, the present invention is by no means limited to the embodiments and Examples thereof described above, and thus various changes based on the technical idea of the present invention can be made.

For example, the structures, the methods, the shapes, the materials, and the numerical values which are given in the embodiments and Examples thereof described above are merely examples, and thus structures, methods, shapes, materials, numerical values and the like different from the structures, the methods, the shapes, the materials, and the numerical values as described above, respectively, may also be used as may be necessary.

In addition, the constitutions of the embodiments described above can be combined with one another without departing from the gist of the present invention.

In addition, although in the embodiments and Examples thereof, the description has been given with respect to the case where the present invention is applied to the optical recording medium having the information recording layer of the single layer or two layers, the present invention is by no means limited to that case. That is to say, the embodiments of the present invention can also be applied to the optical recording medium having the information recording layers of three or more layers. When the three-or more information recording layers are adopted, preferably, the embodiments of the present invention are applied to all of or a part of the information recording layer(s) other than the deepest side information recording layer with the incidence surface of the laser beam as the reference.

In addition, although in the embodiments and Examples thereof, the description has been given with respect to the case where the present invention is applied to the optical recording medium in and from which the information signal is recorded and reproduced by radiating the laser beam from the cover layer side to the information recording layer(s), the present invention is by no means limited to that case. For example, the embodiments of the present invention can also be applied to an optical recording medium which has an information recording layer on a substrate, and in and from which an information signal is recorded and reproduced by radiating a laser beam from the substrate side to the information recording layer. In addition, the embodiments of the present invention can also be applied to an optical recording medium which has two sheets of substrates stuck to each other through an information recording layer and in and from which an information signal is recorded and reproduced by radiating a laser beam from the side of one substrate to the information recording layer between the two sheets of substrates.

In addition, although in the embodiments and Examples thereof, the description has been given with respect to the case where the present invention is applied to the optical recording medium in which the two dielectric layers of the first dielectric layer and the second dielectric layer are formed between the recording layer and the reflecting layer, three or more dielectric layers may also be formed between the recording layer and the reflecting layer. When such a structure is adopted, preferably, the thermal conductivities of the three or more dielectric layers formed between the recording layer and the reflecting layer successively increase from the recording layer toward the reflecting layer.

In addition, in each of the embodiments described above, a dielectric layer, an interface layer, or a layer other than the dielectric layer and the interface layer may be further formed between the recording layer and the reflecting layer in consideration of the characteristics such as the reliability.

In addition, although in the embodiments and Examples thereof described above, the description has been given with respect to the case where the present invention is applied to the optical recording medium in which in the second information recording layer, the thermal conductivity of the second dielectric layer located on the reflecting layer side is made higher than that of the first dielectric layer located on the recording layer side, the present invention is by no means limited to this structure. That is to say, a structure may also adopted such that in the first information recording layer, the thermal conductivity of the second dielectric layer located on the reflecting layer side is made higher than that of the first dielectric layer located on the recording layer side.

In addition, although in the embodiments and Examples thereof described above, the description has been given with respect to the case where the present invention is applied to the optical recording medium in which the phase-change recording layer is used as the recording layer, the present invention is by no means limited thereto. That is to say, any other suitable recording layer can be used as long as the information signal can be repetitively recorded in the recording layer concerned.

In addition, in each of the embodiments described above, a thin film such as a moistureproof film may also be formed on the back surface of the substrate as may be necessary. Either a single layer film or a lamination film, for example, can be used as this thin film. A film which is obtained by laminating a dielectric film made of SiN or the like, and a metallic film made of Al or the like in this order on the back surface of the substrate, for example, can be used as the lamination film. Here, the back surface means a surface opposite to the surface to which the laser beam is made incident. In addition, a label printed layer may be formed on the thin film such as the moistureproof film as may be necessary. In addition, the back surface of the substrate may be roughened as may be necessary.

The present application contains subject matter related to that disclosed in Japanese Priority Patent Application JP 2009-030384 filed in the Japan Patent Office on Feb. 12, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An optical recording medium, comprising:
a substrate; and
an information recording layer formed on said substrate, an information signal being recorded and reproduced in and from said information recording layer by radiation of a light;
wherein said information recording layer includes
a reflecting layer,
a dielectric layer formed on said reflecting layer, and
a recording layer formed on said dielectric layer,
said dielectric layer includes a first dielectric layer and a second dielectric layer, and
a thermal conductivity of said second dielectric layer located on the reflecting layer side is higher than that of said first dielectric layer located on the recording layer side.

2. The optical recording medium according to claim 1, wherein said recording layer is a recording layer in which the information signal is adapted to be repetitively recorded by the radiation of the light.

3. The optical recording medium according to claim 2, wherein said recording layer contains therein bismuth, germanium and tellurium.

4. The optical recording medium according to claim 3, wherein each of said first dielectric layer and said second dielectric layer contains therein oxides of silicon, indium and zirconium, and
a ratio of the oxide of indium contained in said second dielectric layer is larger than that of the oxide of indium contained in said first dielectric layer.

5. The optical recording medium according to claim 1, further comprising:
   an incidence surface to which the light is made incident; and
   a back surface on a side opposite to said incidence surface;
   wherein said recording layer, said dielectric layer and said reflecting layer are laminated in this order from said incidence surface to said back surface.

6. An optical recording medium, comprising:
   a substrate; and
   a first information recording layer and a second information recording layer formed on said substrate, information signals being recorded and reproduced in and from said first information recording layer and said second information recording layer, respectively, by radiation of a light;
   wherein the information signal is recorded and reproduced in and from said first information recording layer by radiating the light transmitted through said second information recording layer to said first information recording layer,
   said second information recording layer includes
      a reflecting layer,
      a dielectric layer formed on said reflecting layer, and
      a recording layer formed on said dielectric layer,
   said dielectric layer includes a first dielectric layer and a second dielectric layer, and
   a thermal conductivity of said second dielectric layer located on the reflecting layer side is higher than that of said first dielectric layer located on the recording layer side.

7. The optical recording medium according to claim 6, wherein said first information recording layer includes a recording layer containing therein germanium, antimony and tellurium; and
   said recording layer of said second information recording layer contains therein bismuth, germanium and tellurium.

8. An optical recording medium, comprising:
   a substrate; and
   an information recording layer formed on said substrate, an information signal being recorded and reproduced in and from said information recording layer by radiation of a light;
   wherein said information recording layer includes
      a reflecting layer,
      a dielectric layer formed on said reflecting layer, and
      a recording layer formed on said dielectric layer containing therein bismuth, germanium and tellurium, and
   said dielectric layer contains therein oxides of silicon, indium and zirconium.

9. An optical recording medium, comprising:
   a substrate; and
   a first information recording layer and a second information recording layer formed on said substrate, information signals being recorded and reproduced in and from said first information recording layer and said second information recording layer, respectively, by radiation of a light;
   wherein the information signal is recorded and reproduced in and from said first information recording layer by radiating the light transmitted through said second information recording layer to said first information recording layer,
   said second information recording layer includes
      a reflecting layer,
      a dielectric layer formed on said reflecting layer, and
      a recording layer formed on said dielectric layer, containing therein bismuth, germanium and tellurium and
   said dielectric layer contains therein oxides of silicon, indium and zirconium.

* * * * *